United States Patent [19]

Arnon

[11] Patent Number: 5,408,260
[45] Date of Patent: Apr. 18, 1995

[54] CUSTOMER PREMISES ADSL SIGNAL DISTRIBUTION ARRANGEMENT

[75] Inventor: Ephraim Arnon, Ottawa, Canada

[73] Assignee: Northern Telecom Limited, Montreal, Canada

[21] Appl. No.: 180,155

[22] Filed: Jan. 11, 1994

[51] Int. Cl.⁶ .......................................... H04N 7/173
[52] U.S. Cl. ......................................... 348/6; 348/12; 455/5.1
[58] Field of Search .................... 348/6, 8, 10, 12, 13; 455/3.1, 4.1, 4.2, 5.1, 6.1; H04N 7/16, 7/173, 7/14, 7/15, 7/10; 358/86; 379/93, 94, 90, 110; 380/5, 10

[56] References Cited

U.S. PATENT DOCUMENTS 5,247,347  9/1993  Litteral et al. ...................... 348/12

FOREIGN PATENT DOCUMENTS 11713  7/1992  WIPO ............................... 358/86

OTHER PUBLICATIONS

J. A. C. Bingham, "Multicarrier Modulation for Data Transmission: An Idea Whose Time Has Come", IEEE Communications Magazine, vol. 28, No. 5, pp. 5–14, May 1990.

S. Fleming et al., "ADSL: The On-Ramp to the Information Highway", Telephony, pp. 20–26, Jul. 12, 1993.

Primary Examiner—James J. Groody
Assistant Examiner—Chris Grant
Attorney, Agent, or Firm—R. John Haley

[57] ABSTRACT

A plurality of ADSL (asymmetric digital subscriber line) terminals are coupled to the coaxial cable of a cable television distribution arrangement. Each ADSL terminal is coupled to a respective ADSL path and a respective customer premises telephone line for coupling of telephone signals. Each ADSL terminal comprises a transmitter for supplying asymmetric signals received via the respective ADSL path to the coaxial cable, and transmitters and receivers for communicating bidirectional data and control signals, communicated via the respective ADSL path, via the coaxial cable, in each case modulated at a frequency which is not used for television signals. Customer premises equipment includes corresponding receivers and transmitters. The arrangement permits the ADSL terminals to be used as a resource shared by a plurality of customer premises.

15 Claims, 4 Drawing Sheets

CUSTOMER PREMISES ADSL SIGNAL DISTRIBUTION ARRANGEMENT

This invention relates to an arrangement for distributing signals to customer premises, the signals including signals supplied using ADSL (asymmetric digital subscriber line) techniques.

BACKGROUND OF THE INVENTION

It has been recognized that there is a demand for various forms of information to be communicated to and from customer premises such as residences. This information includes, in particular, video-on-demand (VOD) and near-VOD (e.g. movies with stepped starting times) television programs in the downstream direction to the customer premises, upstream control information for selection of such programs, and bidirectional communications services.

Existing analog coaxial cable television distribution arrangements have not met this demand in view of their limited bandwidth and hence limited television channel capacity and inability, or limited ability, to carry communications upstream to the so-called head end. Future coaxial cable systems will enhance this capability by adding digital television and bidirectional communications services.

Optical fiber networks have the capability of meeting this demand, but do not generally extend to residential customer premises. Telephone subscriber lines (unloaded twisted pair cables) have until recently had insufficient bandwidth to carry video signals.

ADSL technology, for example using multicarrier modulation, makes it possible to send data at bit rates in excess of 6 Mb/s downstream, and simultaneously to communicate other data at lower bit rates as well as telephone signals bidirectionally, over a single telephone subscriber line, referred to as an ADSL loop. The principles of multicarrier modulation are described for example in "Multicarrier Modulation For Data Transmission: An Idea Whose Time Has Come" by John A. C. Bingham, IEEE Communications Magazine, Vol. 28, No. 5, pages 5-14, May 1990. An overview of ADSL is provided in an article by S. Fleming et al. entitled "ADSL: The on-ramp to the information highway", Telephony, Jul. 12, 1993, pages 20-26. This article describes an ADSL system in which four asymmetric 1.5 Mb/s channels are provided for transmission in a downstream direction from a telephone CO (central office) to a subscriber, in addition to various data channels and POTS (plain old telephone service) carried symmetrically (i.e. bidirectionally), via a two-wire telephone subscriber line. The four 1.5 Mb/s channels can together carry one, two, or four digital video signals with different levels of compression.

Thus three technologies, namely fiber/coax, fiber-in-the-loop or FITL, and ADSL systems, are being developed for delivering enhanced (e.g. digital) television services and bidirectional communications services to customer premises. These will converge in the customer premises, where it is highly desirable that they all use the same customer premises equipment and wiring.

Furthermore, the customer premises wiring or signal distribution arrangement must take into account a number of considerations, such as the different services required by different customers, different types of customer premises (e.g. single and multiple residential units), the desirability of avoiding bulky cables and rewiring in the customer premises, and ease of evolution as new services and facilities are developed and installed.

An object of this invention, therefore, is to provide an advantageous arrangement for distributing signals to customer premises.

SUMMARY OF THE INVENTION

According to one aspect of this invention there is provided an arrangement for distributing signals to customer premises, comprising: a coaxial cable for supplying television signals at predetermined frequencies to a plurality of customer premises; a plurality of ADSL (asymmetric digital subscriber line) terminals each for receiving asymmetric signals from, and for communicating telephone and bidirectional signals via, a respective ADSL path; and a plurality of telephone lines each coupled to a respective one of the ADSL terminals for communicating the telephone signals to a customer premises; wherein each ADSL terminal includes means for supplying the asymmetric signals to, and for communicating the bidirectional signals via, the coaxial cable at at least one respective frequency different from said predetermined frequencies; the arrangement further comprising means at at least one customer premises for receiving the asymmetric signal from, and for communicating the bidirectional signals via, the coaxial cable at said at least one respective frequency.

According to another aspect this invention provides a signal distribution arrangement comprising: a coaxial cable for supplying television signals in predetermined television signal channels to a plurality of customer premises; a plurality of ADSL (asymmetric digital subscriber line) terminals each coupled to the coaxial cable, a respective ADSL path, and a respective telephone line, each ADSL terminal being arranged to couple telephone signals between the respective ADSL path and the respective telephone line, and comprising a transmitter for supplying asymmetric signals received via the respective ADSL path to the coaxial cable modulated at a respective frequency, and a transceiver for communicating bidirectional signals, communicated via the respective ADSL path, via the coaxial cable modulated at a respective frequency; and customer premises equipment coupled to the coaxial cable and comprising a receiver for receiving asymmetric signals modulated at a respective frequency from the coaxial cable, and at least one transmitter and at least one receiver for communicating bidirectional signals via the coaxial cable at at least one respective frequency.

Conveniently the asymmetric signals and the bidirectional signals are transmitted in quadrature amplitude modulated form. The bidirectional signals are preferably communicated by the at least one transmitter and at least one receiver at different frequencies for the two directions of transmission on the coaxial cable.

The invention also extends to customer premises equipment for use in a signal distribution arrangement, the equipment comprising: a coupler for coupling signals at first predetermined frequencies from a coaxial cable to a television receiver; a receiver coupled to the coupler for receiving from the coaxial cable asymmetric signals modulated at a second predetermined frequency different from said first predetermined frequencies; at least one transmitter and at least one receiver coupled to the coupler for communicating bidirectional signals modulated at at least a third predetermined frequency different from the first and second predetermined frequencies; and a data and control unit coupled to said receiver and to said at least one transmitter and at least one receiver for processing the asymmetric and bidirectional signals.

BRIEF DESCRIPTION OF THE DRAWINGS

The invention will be further understood from the following description with reference to the accompanying drawings, in which.

DETAILED DESCRIPTION

Figure 1:
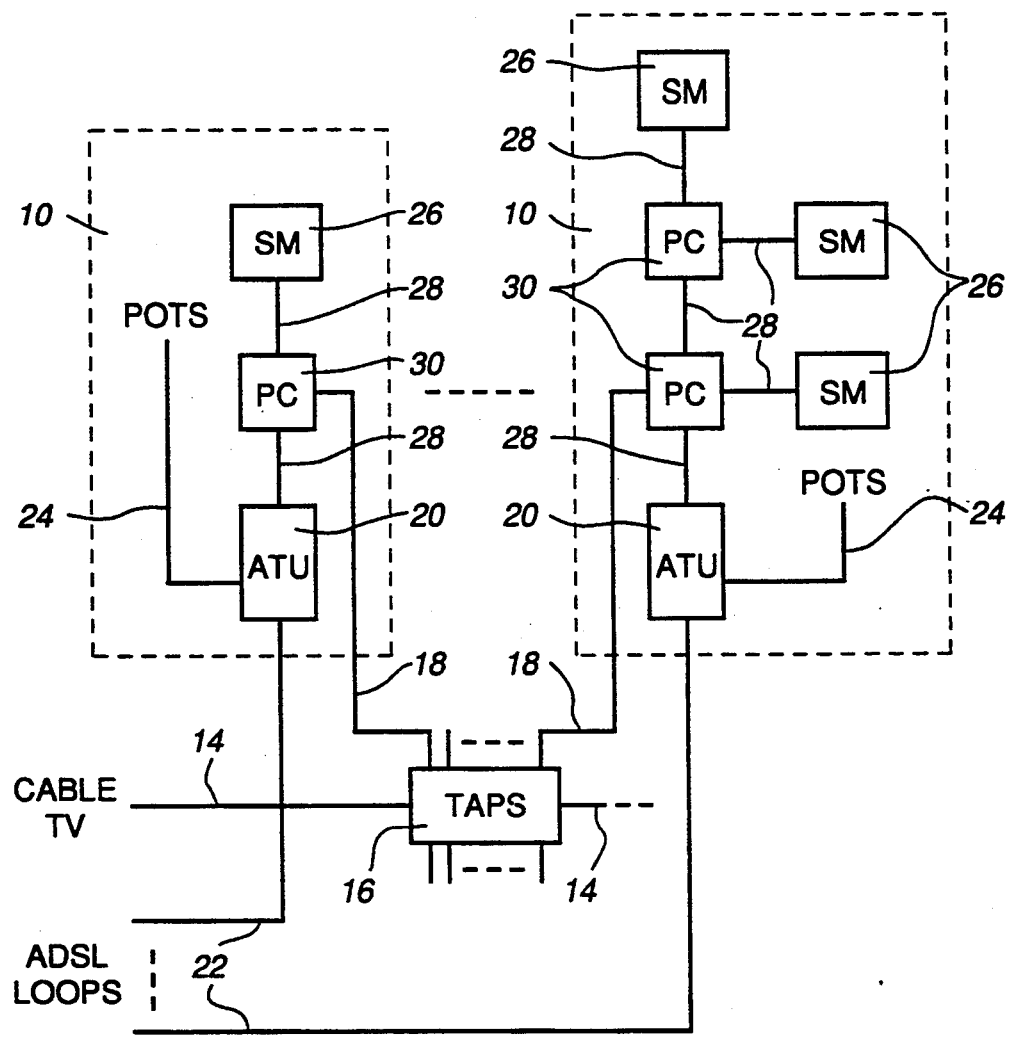
FIGS. 1 and 2 schematically illustrate customer premises signal distribution arrangements in accordance with embodiments of this invention.
Figure 2:
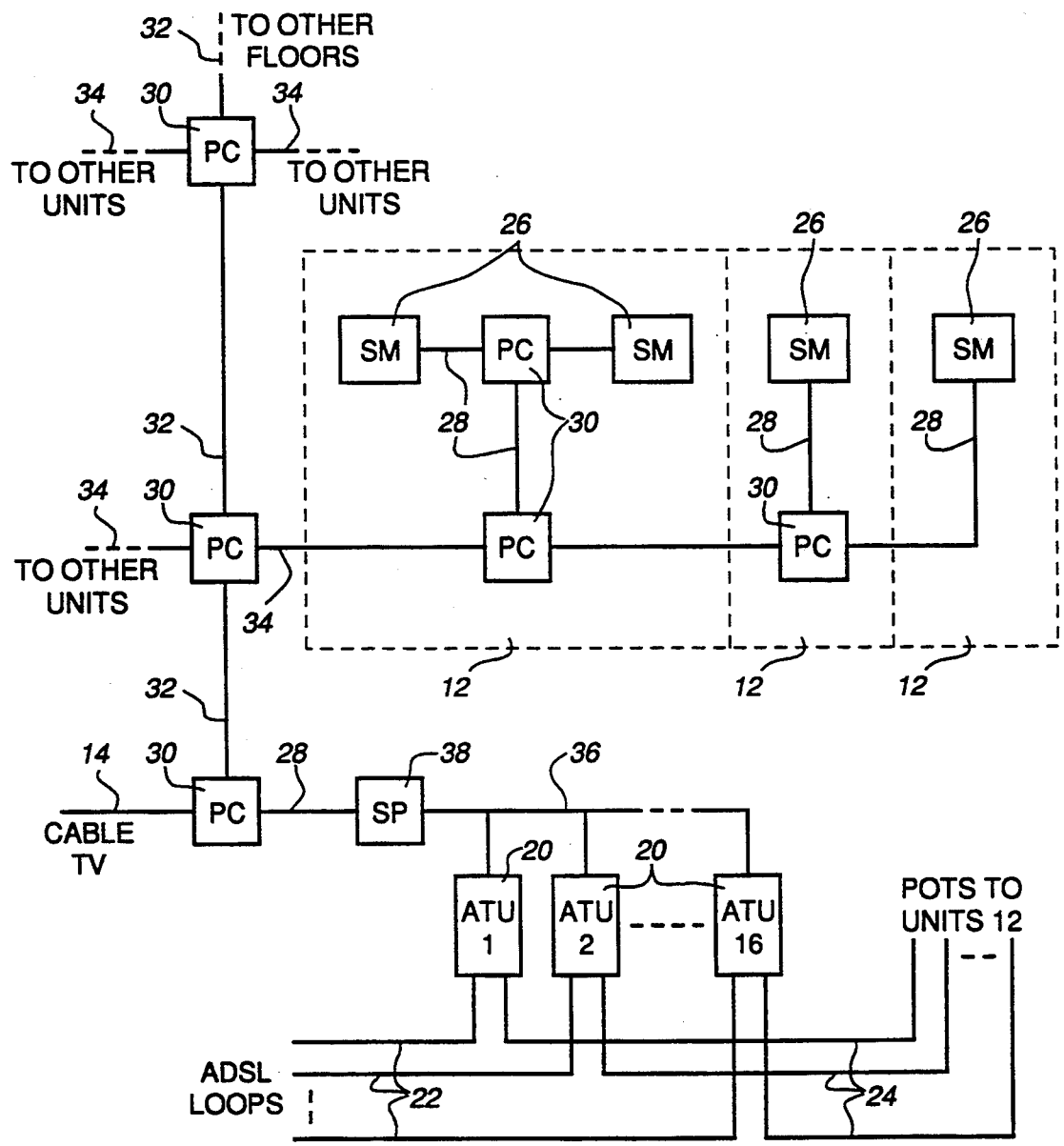
Figure 4:
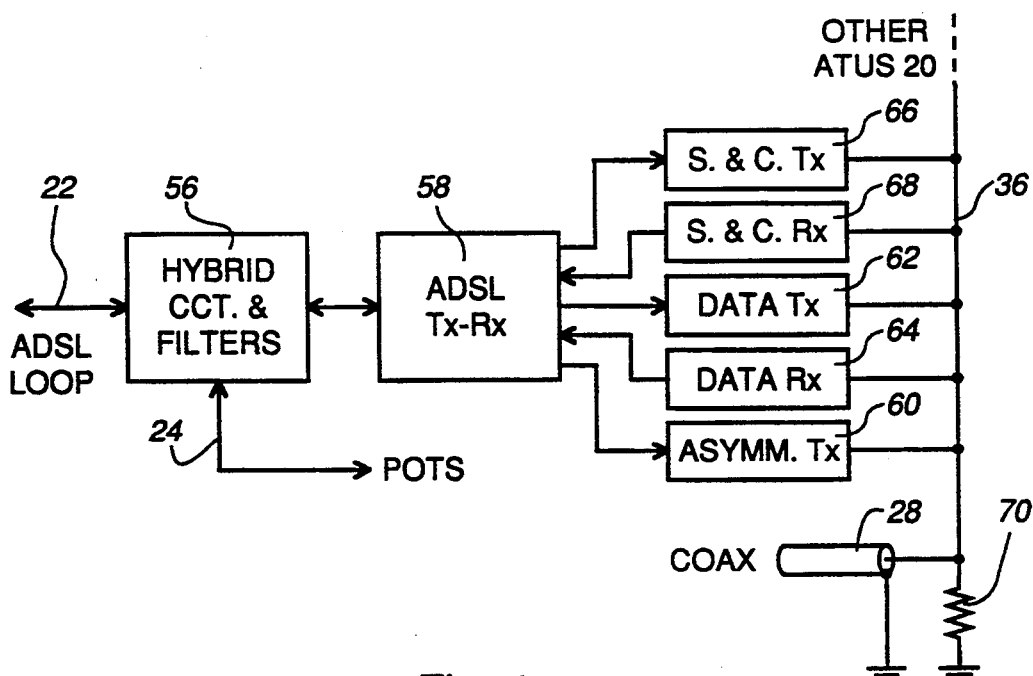
FIG. 4 shows a block diagram of an ADSL terminal unit and summing point used in the arrangement of FIG. 2.
Figure 5:
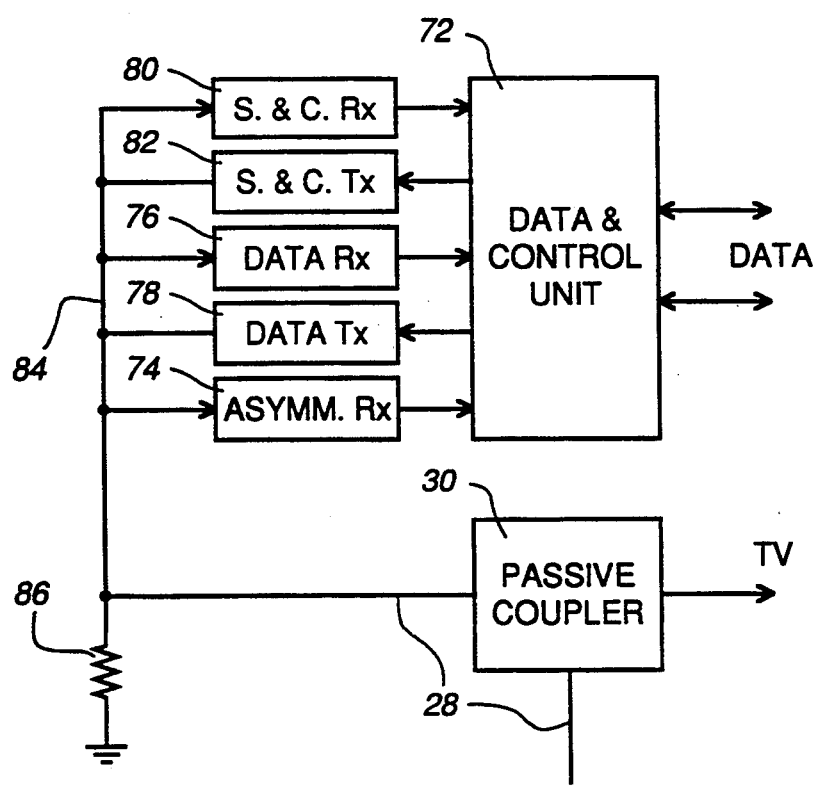
FIG. 5 shows a block diagram of a service module and passive coupler used in the arrangements of FIGS. 1 and 2.

In FIGS. 1 and 2, boxes PC represent passive (and hence bidirectional) couplers, which can comprise resistive couplers or transformer couplers which are well known in the art. Boxes ATU each represent an ADSL (asymmetric digital subscriber line) terminal unit, a block diagram illustration of which is shown in FIG. 4, and a box SP in FIG. 2 represents a summing point which is also shown in more detail in FIG. 4. Boxes SM each represent a service module, a block diagram illustration of which is shown in FIG. 5. Dashed line rectangles are used in FIGS. 1 and 2 to represent distinct residential units.

Referring to FIG. 1, residential units 10, for example houses on a street, are each supplied with cable television services via a conventional cable television distribution arrangement including a coaxial cable 14, customer taps 16, and coaxial drop cables 18 each to a respective residential unit.

Each residential unit 10 is also provided with an ADSL terminal unit or ATU 20, to which a respective ADSL loop 22 is connected. The ADSL loops 22 are conventional two-wire telephone subscriber lines to the residential units 10, 12, carrying ADSL signals as described further below. The ADSL signals include POTS (plain old telephone service) signals which are supplied to and from the ATU 20 via a two-wire line 24 within each residential unit 10.

Within each residential unit 10, other ADSL signals are coupled between the respective ATU 20 and at least one service module 26 via coaxial cables 28 and at least one passive coupler 30, to which the respective coaxial drop cable 18 is also coupled. Thus the ADSL signals are combined with the cable television signals (at different frequencies, as described below) for supply to the service modules 26.

Referring to FIG. 2, a comparable arrangement is illustrated for residential units 12 which are for example units within a multiple unit building with several floors. As shown in FIG. 2, the coaxial cable 14 of a conventional cable television distribution arrangement is coupled by a passive coupler 30 to a coaxial cable 32 in a riser of the building, which cable 32 is coupled via passive couplers 30 to distribution coaxial cables 34 on each floor of the building. The distribution cables 34 are coupled via further passive couplers 30 and coaxial cables 28 to service modules 26 within the residential units 12. This arrangement facilitates a reduction in the amount of coaxial cable required in the building, but other arrangements, for example a star arrangement of coaxial cables to the units on each floor of the building, could alternatively be provided.

ATUs 20 for the residential units are conveniently arranged centrally within the building, terminating the ADSL loops 22 and with POTS signals on two-wire lines 24 extending to telephones within the individual units. The other ADSL signals are coupled from the ATUs 20 via a common bus 36 and a summing point 38, as further described below. The summing point 38 is coupled via a coaxial cable 28 and one of the passive couplers 30 to the rest of the coaxial cable network, for example via the riser cable 32 as illustrated. These ADSL signals and cable television signals (at different frequencies) are thereby combined for supply to the service modules 26 as in the arrangement of FIG. 1.

By way of example, FIG. 2 represents that there may be up to 16 ATUs 20. This number is chosen for convenience in view of channel capacities and bit rates as described below, but it should be appreciated that other maximum numbers of such units can alternatively be provided as desired.

Figure 3:
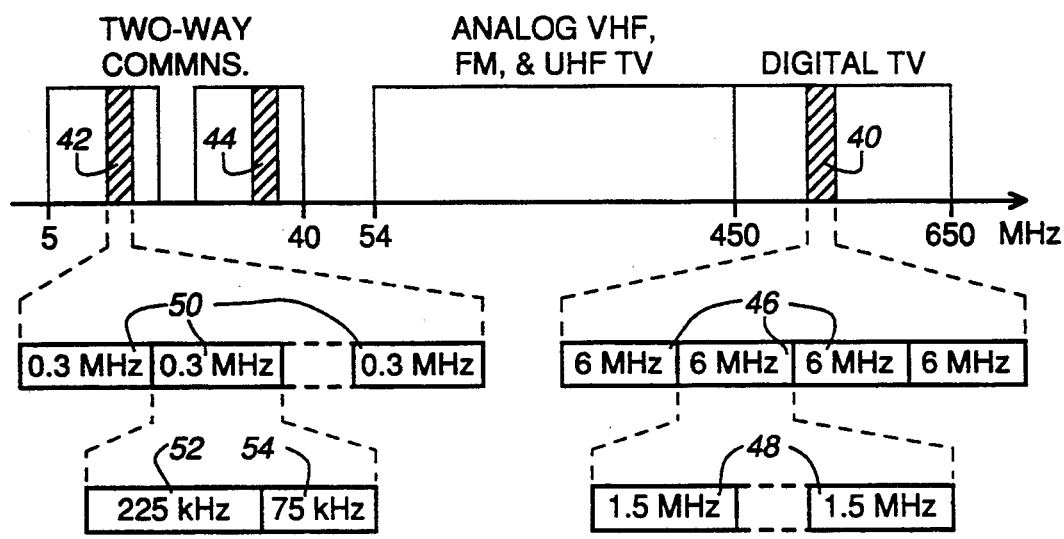
FIG. 3 illustrates a radio frequency spectrum for signals in the arrangements of FIGS. 1 and 2.

Referring now to FIG. 3, an RF (radio frequency) spectrum is illustrated for the signals on the coaxial cables 28, 32, and 34. The coaxial cable 14 supplies analog VHF and UHF television channels, as well as FM radio channels, in a frequency range from 54 MHz to about 450 MHz, and may also supply further television channels at higher frequencies, for example digital television channels at frequencies from 450 to 650 MHz. As is well known, each television channel is allocated a bandwidth of 6 MHz. Four such channels, providing a bandwidth of 24 MHz, are shown by shading 40 in FIG. 3 and are allocated to downstream ADSL channels as further described below. The term downstream refers to transmission of signals in the direction from the head end to the customer premises, the downstream ADSL channels forming the asymmetric component of the ADSL signals.

The ADSL signals on the loops 22 also carry bidirectional or symmetric signals, at lower bit rates than the asymmetric signals. The RF spectrum shown in FIG. 3 includes two low frequency bands, for example located in a frequency range from 5 to 40 MHz, which serve for bidirectional or two-way communications on the coaxial cables 28, 32, and 34, one of these frequency bands being used for each direction of transmission. Within these bands, FIG. 3 illustrates by shading frequency bands 42 and 44 which are used for two-way communication of the bidirectional ADSL signals on the coaxial cables 28, 32, and 34. For convenience, it is assumed in the following description that the frequency band 42 is used for transmission in the downstream direction from the ATUs 20 to the service modules 26, and that the frequency band 44 is used for transmission in the upstream direction from the service modules 26 to the ATUs 20. Each of the frequency bands 42 and 44 has a bandwidth of 4.8 MHz as described below.

It is observed that although as described here the frequency bands used for two-way communications are provided at low frequencies, such bands could instead, or in addition, be provided at high frequencies, for example above 650 MHz.

As is known for example from the article by S. Fleming et al. mentioned above, each ADSL loop may carry four asymmetric 1.5 Mb/s channels, or a total of 6 to 7 Mb/s including overhead, in the downstream direction, and bidirectional data at bit rates of up to 1.536 Mb/s, which can be divided into a data sub-channel at 1.28 Mb/s and a signalling and control sub-channel at 256 kb/s.

FIG. 3 illustrates that the 24 MHz band shown by the shading 40 is made up of four 6 MHz sub-bands 46, each of which in turn comprises four 1.5 MHz sub-bands 48. There are thus 16 sub-bands 48, each of which accommodates the asymmetric data of a respective one of the 16 ATUs 20, using well-known 64 QAM (quadrature amplitude modulation) techniques.

As also illustrated in FIG. 3, the 4.8 MHz frequency band 42 comprises 16 sub-bands 50, each of which has a bandwidth of 0.3 MHz, is allocated to a respective one of the ATUs 20, and is made up of a 225 kHz sub-band 52 and a 75 kHz sub-band 54. The frequency band 44 is similarly subdivided for the 16 ATUs 20 in the opposite direction of transmission. Again using 64 QAM techniques, each sub-band 52 accommodates the 1.28 Mb/s data sub-channel of the respective ATU 20, and each subband 54 accommodates the 256 kb/s signalling and control sub-channel of the respective ATU 20.

FIG. 4 shows a block diagram of an ATU 20 and the common summing point 38 used in the arrangement of FIG. 2; in the arrangement of FIG. 1 the same configuration may be used, with the summing point incorporated within each individual ATU 20. The ATU 20 comprises a hybrid circuit and filter unit 56, an ADSL transceiver 58, three tuned 64 QAM transmitters (Tx) 60, 62, and 66, and two tuned 64 QAM receivers (Rx) 64 and 68. The unit 56 is coupled to the respective ADSL loop 22, and serves to split off the low frequency POTS signals on the line 24 from the higher frequency digital signals for the ADSL transceiver 58. The ADSL transceiver 58 can be a multicarrier modulation transceiver having the form generally described in the article by John A.C. Bingham referred to above.

The transmitters 60, 62, and 66 have high impedance or current-sourcing outputs coupled to the common bus 36, and the receivers 64 and 68 have high impedance inputs coupled to the bus 36, to which transmitters and receivers in all of the ATUs 20 are coupled in the same manner for transmitting signals thereto and receiving signals therefrom at the respective frequencies to which the transmitters and receivers are tuned. The common bus 36 is connected to the coaxial cable 28 at a point at which the cable 28 is terminated with its characteristic impedance in the form of a resistor 70, thereby constituting the summing point 38 of FIG. 2.

In each ATU 20, the transmitter 60 is supplied from the ADSL transceiver 58 with the asymmetric data received in the downstream direction from the ADSL loop 22, and transmits this at the respective frequency sub-band 48 which is allocated to this ATU and to which the transmitter 60 is tuned. Correspondingly, the transmitter 62 is tuned to a respective sub-band 52 in the frequency band 42, and the receiver 64 is tuned to the respective sub-band 52 in the frequency band 44, for communicating bidirectional data between the ADSL transceiver 58 and the bus 36. Similarly, the transmitter 66 is tuned to the respective sub-band 54 in the frequency band 42, and the receiver 68 is tuned to the respective sub-band 54 in the frequency band 44, for communicating signalling and control (S. & C.) information between the ADSL transceiver 58 and the bus 36.

FIG. 5 shows a block diagram of a service module 26 and a passive coupler 30 to which the service module 26 is coupled via a coaxial cable 28. The service module 26 includes a data and control unit 72, tuned 64 QAM receivers 74 for receiving the asymmetric data, 76 for receiving bidirectional data, and 80 for receiving signalling and control information, and tuned 64 QAM transmitters 78 for transmitting bidirectional data and 82 for transmitting signalling and control information, which receivers and transmitters are complementary to the transmitters and receivers 60 to 68 of a respective ATU 20. The receivers and transmitters 74 to 82 are coupled between the data and control unit 72 and a common bus 84 to which they present high impedance connections, the bus 84 being coupled to the coaxial cable 28 at a summing point constituted by a matching resistor 86.

The passive coupler 30 couples an incoming coaxial cable 28 to the coaxial cable 28 leading to the bus 84 and to a conventional television receiver (TV, not shown), which serves to receive the cable television signals in conventional manner. The receivers and transmitters 74 to 82 are tuned to the respective sub-bands 48, 52, and 54. The asymmetric data and bidirectional data signals are coupled to the data and control unit 72, which is in turn coupled to data terminal units which can be of various forms and are not shown. By way of example, one such terminal unit may comprise the television receiver referred to above, in which case the unit 72 may include decompression and conversion facilities for converting the asymmetric data into television signals receivable by the receiver. Other such terminal units may comprise computing, communications (e.g. ISDN), or other equipment as desired, with the unit 72 containing hardware and software functions appropriate for such terminal units, as generally known in the art. The signalling and control information is similarly coupled to the data and control unit 72, for providing for signalling and control functions in known manner.

It should be appreciated from the above description that arrangements in accordance with this invention provide for an integration of the distribution facilities used at customer premises for distribution of both cable television services and data communicated via ADSL loops. As the latter data is segregated in frequency from the cable television services, in that the bidirectional data is communicated in frequency bands separate from the frequencies of television channels, and the asymmetric data is communicated in a frequency band which can conveniently be reserved for such use and constitutes only a small part of the available RF spectrum, there need be no need for conflict between the cable television service and ADSL data signals on the coaxial cable network. In order to prevent the ADSL data signals from propagating via the main coaxial distribution cable 14 in an undesired manner, if necessary filters and/or attenuators can be provided at the customer taps 16 in the arrangement of FIG. 1, or at the coupling of the cable 14 to the riser cable 32 in the arrangement of FIG. 2, to suppress the ADSL data signal frequencies on the coaxial cable 14.

As is known in the art, each service module 26 can be an addressable unit with a unique address. In order to avoid contention among different service modules 26 within a single residential unit 10 or 12 wishing simultaneously to communicate with the respective ATU 20, the ATU may, using the signalling and control information, poll the service modules 26 in turn using their respective addresses. For example, each ATU may poll a total of 10 addresses in turn, of which 8 addresses may be allocated to respective ones of 8 service modules 26 within a residential unit 10 or 12, and the remaining two addresses may be used for sharing resources in the manner described below.

By way of example, it is observed that the ADSL data signals may be communicated using ATM (asynchronous transfer mode) techniques, with each ATM cell in the downstream direction including the address of the service module 26 for which it is intended. ATM cells can similarly be used for transmission of the signalling and control information. In consequence, although the arrangement of FIG. 2 has been described above in the context of providing one ATU 20 for each respective residential unit 12, this need not necessarily be the case. Instead, a group comprising an arbitrary number of ATUs 20 may be used as a shared resource for an arbitrary number of residential units, with the ADSL signals being delivered to the service modules 26 in those units in accordance with the service module addresses. The same principles can also be applied to the arrangement of FIG. 1, provided that the ADSL signals are able to propagate between the different drop cables 18.

As an example of this, the arrangement of FIG. 2 may be provided with a generally one-to-one correspondence between ATUs 20 and residential units 12, except that one of the ATUs 20 may be missing or faulty. As the POTS signals for the corresponding residential unit 12 are handled passively within, or bypass, the ADSL equipment, the POTS signals to this residential unit are unaffected. The signalling and control information transmitter 86 in the service module 26 of the customer whose ATU is missing or faulty can then be retuned, manually or automatically, to another one of the subbands 54, in which it can then respond to one of the remaining two polling addresses referred to above to communicate with the head end via a different ATU 20. The head end can then allocate for the customer spare capacity of one or more other ATUs 20 for communication of ADSL data with that service module, whose receivers and transmitters 74 to 82 can then be tuned (again, manually or automatically) accordingly.

It can be seen that these principles can be extended generally, so that there need not be any specific allocation of individual ATUs to residential units. Instead, a group of ATUs may be provided as a shared resource for a larger group of residential units, with the ADSL facilities being used collectively as requested by addressable service modules 26 within the residential units.

Thus although particular embodiments of the invention have been described above, it should be appreciated that numerous modifications, variations, and adaptations may be made without departing from the scope of the invention as defined in the claims.

In particular, it is observed that different numbers of ATUs 20 may be grouped in a similar manner to suit particular circumstances, and different modulation schemes and frequency bands can be used for transmission of the various ADSL signals on the coaxial cables. In addition, the frequency bands 42 and 44 may be accommodated within high frequency 6 MHz television channels, instead of analog or digital television signals in such channels, rather than at the low frequencies as described above.

What is claimed is:

1. An arrangement for distributing signals to customer premises, comprising:
   a coaxial cable for supplying television signals at predetermined frequencies to a plurality of customer premises;
   a plurality of ADSL (asymmetric digital subscriber line) terminals each for receiving asymmetric signals from, and for communicating telephone and bidirectional signals via, a respective ADSL path; and
   a plurality of telephone lines each coupled to a respective one of the ADSL terminals for communicating the telephone signals to a customer premises;
   wherein each ADSL terminal includes means for supplying the asymmetric signals to, and for communicating the bidirectional signals via, the coaxial cable at at least one respective frequency different from said predetermined frequencies;
   the arrangement further comprising means at at least one customer premises for receiving the asymmetric signal from, and for communicating the bidirectional signals via, the coaxial cable at said at least one respective frequency.

2. A distribution arrangement as claimed in claim 1 wherein the means in each ADSL terminal for supplying the asymmetric signals to the coaxial cable comprises a transmitter tuned to a respective frequency.

3. A distribution arrangement as claimed in claim 2 wherein the tuned transmitters in a plurality of ADSL terminals are tuned each to a respective frequency within a 6 MHz frequency band.

4. A distribution arrangement as claimed in claim 3 wherein each transmitter for supplying the asymmetric signals to the coaxial cable is arranged to supply said asymmetric signals within a respective 1.5 MHz subband.

5. A distribution arrangement as claimed in claim 1 wherein the means in each ADSL terminal for communicating the bidirectional signals via the coaxial cable comprises at least one transmitter and at least one receiver arranged to transmit and receive the bidirectional signals at respective frequencies.

6. A distribution arrangement as claimed in claim 5 wherein said at least one transmitter and at least one receiver comprise a first transmitter and receiver for transmitting and receiving bidirectional data signals at respective frequencies, and a second transmitter and receiver for transmitting and receiving bidirectional control signals at respective frequencies.

7. A distribution arrangement as claimed in claim 5 wherein said at least one transmitter in each ADSL terminal is tuned to transmit signals at a respective frequency in a first frequency band for a downstream transmission direction on the coaxial cable, and the at least one receiver in each ADSL terminal is arranged to receive signals at a respective frequency in a second frequency band for an upstream transmission direction on the coaxial cable.

8. A distribution arrangement as claimed in claim 7 wherein the first and second frequency bands are below said predetermined frequencies.

9. A signal distribution arrangement comprising:
   a coaxial cable for supplying television signals in predetermined television signal channels to a plurality of customer premises;
   a plurality of ADSL (asymmetric digital subscriber line) terminals each coupled to the coaxial cable, a respective ADSL path, and a respective telephone line, each ADSL terminal being arranged to couple telephone signals between the respective ADSL path and the respective telephone line, and comprising a transmitter for supplying asymmetric signals received via the respective ADSL path to the coaxial cable modulated at a respective frequency, and a transceiver for communicating bidirectional signals, communicated via the respective ADSL path, via the coaxial cable modulated at a respective frequency; and customer premises equipment coupled to the coaxial cable and comprising a receiver for receiving asymmetric signals modulated at a respective frequency from the coaxial cable, and at least one transmitter and at least one receiver for communicating bidirectional signals via the coaxial cable at at least one respective frequency.

10. A signal distribution arrangement as claimed in claim 9 wherein the bidirectional signals are communicated by the at least one transmitter and at least one receiver at different frequencies for the two directions of transmission on the coaxial cable.

11. A distribution arrangement as claimed in claim 9 wherein said at least one transmitter and at least one receiver comprise a first transmitter and receiver for transmitting and receiving bidirectional data signals at respective frequencies, and a second transmitter and receiver for transmitting and receiving bidirectional control signals at respective frequencies.

12. Customer premises equipment for use in a signal distribution arrangement, the equipment comprising:

a coupler for coupling signals at first predetermined frequencies from a coaxial cable to a television receiver;

a receiver coupled to the coupler for receiving from the coaxial cable asymmetric signals modulated at a second predetermined frequency different from said first predetermined frequencies;

at least one transmitter and at least one receiver coupled to the coupler for communicating bidirectional signals modulated at at least a third predetermined frequency different from the first and second predetermined frequencies; and a data and control unit coupled to said receiver and to said at least one transmitter and at least one receiver for processing the asymmetric and bidirectional signals.

13. Customer premises equipment as claimed in claim 12 wherein the asymmetric signals modulated at the second predetermined frequency have a 1.5 MHz bandwidth.

14. Customer premises equipment as claimed in claim 12 wherein the bidirectional signals modulated at the third predetermined frequency have a bandwidth of about 0.3 MHz for each direction of transmission..

15. Customer premises equipment as claimed in claim 12 wherein said at least one transmitter and at least one receiver comprise a first transmitter and receiver for transmitting and receiving bidirectional data signals at respective frequencies, and a second transmitter and receiver for transmitting and receiving bidirectional control signals at respective frequencies.

* * * * *